United States Patent [19]

Kleijwegt

[11] 4,142,568

[45] Mar. 6, 1979

[54] BIAS TIRE WITH EMBEDDED WIRE BREAKERS

[75] Inventor: Jacob Kleijwegt, Arlon, Belgium

[73] Assignee: The Goodyear Tire & Rubber Company, Akron, Ohio

[21] Appl. No.: 771,226

[22] Filed: Feb. 23, 1977

[51] Int. Cl.² ............................ B60C 9/06; B60C 9/08
[52] U.S. Cl. ............................ 152/354 R; 152/357 R; 152/361 R
[58] Field of Search ............... 152/354, 357 R, 357 A, 152/361 R, 361 DM, 361 FP, DIG. 19

[56] References Cited

U.S. PATENT DOCUMENTS

| | | | |
|---|---|---|---|
| 3,068,926 | 12/1962 | Jacob et al. ......................... | 152/354 |
| 3,589,424 | 6/1971 | Sasaki et al. ......................... | 152/354 |
| 3,620,279 | 11/1971 | Bartha et al. ................. | 152/361 R X |
| 3,685,564 | 8/1972 | Smithkey, Jr. ............... | 152/361 R X |
| 3,799,233 | 3/1974 | Cappa ............................. | 152/354 X |
| 3,863,696 | 2/1975 | Sperberg ..................... | 152/361 R X |
| 3,989,083 | 11/1976 | Chrobak ....................... | 152/361 R X |
| 4,043,372 | 8/1977 | Miyoshi et al. ................... | 152/354 R |

*Primary Examiner*—Francis S. Husar
*Assistant Examiner*—Randolph A. Reese
*Attorney, Agent, or Firm*—Frederick K. Lacher; Frank Pincelli

[57] ABSTRACT

A bias tire having numerous carcass plies reinforced with nylon cords and a pair of breaker strips embedded in the carcass plies in the area of the tread of the tire. The breaker strips are reinforced with wire cords. The wire cords of the breaker strips and the nylon cords of the carcass plies are disposed at substantially the same angles. A cap strip covers the breaker strips and carcass plies in the area of the tread. The cap strip is a single layer of nylon cords which are disposed at substantially the same angles as the cords of the carcass plies and breaker strips. The ends of the cap strip extend into the sidewalls of the tire.

6 Claims, 4 Drawing Figures

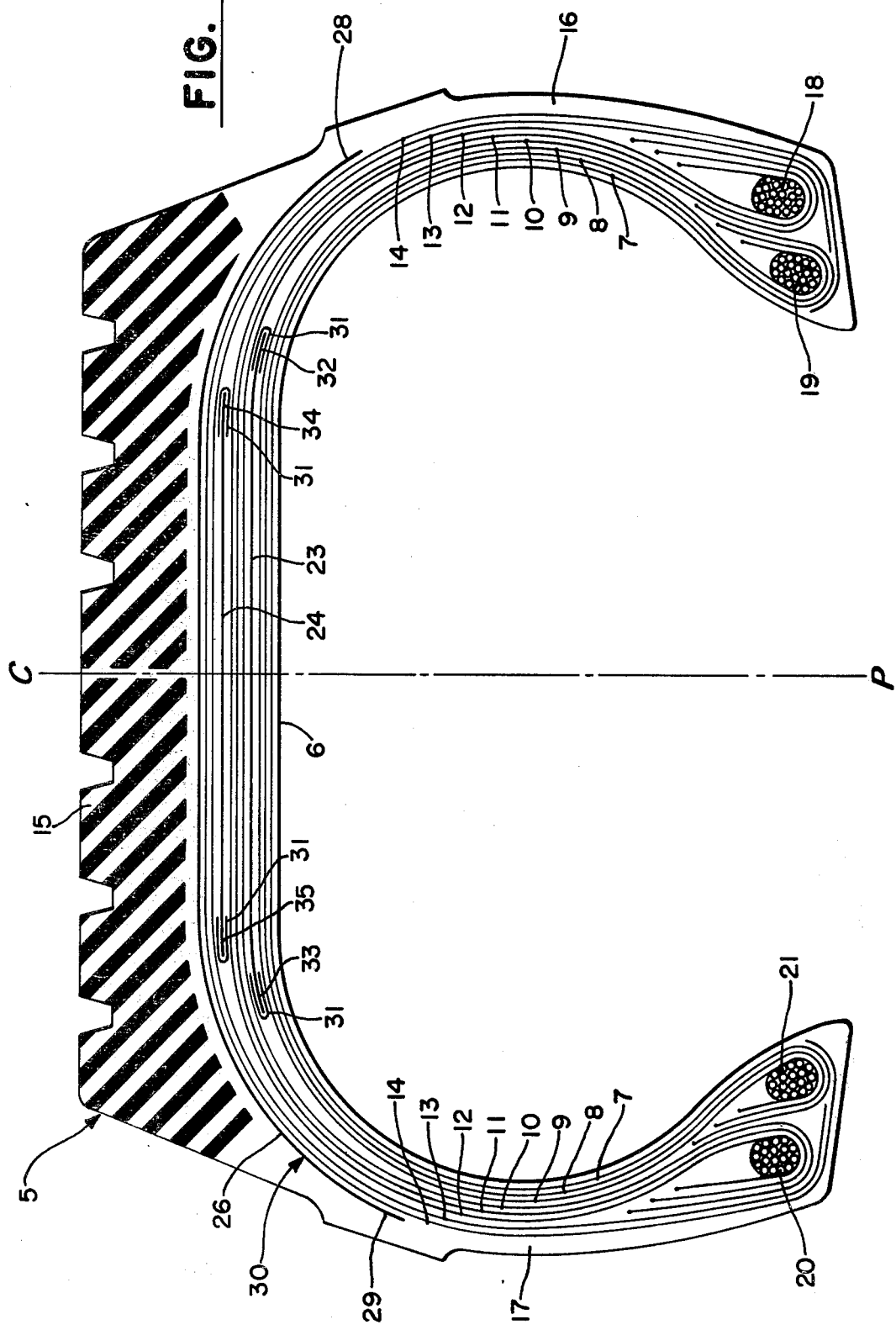

BIAS TIRE WITH EMBEDDED WIRE BREAKERS

BACKGROUND OF THE INVENTION

U.S. Pat. Nos. 2,348,350; 3,068,926; 3,620,279; and 3,780,782, show and describe tires in which breaker strips are embedded within the carcass plies of the tire for the purpose of eliminating separation of the edges of the breaker strips from the carcass plies, as frequently happens when the breaker strips are together, apart from the carcass plies; i.e. a plurality of breaker strips are interposed between the tread and radially outermost carcass ply of the tire. The invention is directed to an improvement in such tires.

Briefly stated, the invention is in a bias tire having a number of carcass plies, each of which are reinforced with textile cords of the group of rayon, nylon, and polyester. A pair of breaker strips or plies, reinforced with high modulus cords of the group of materials of steel and aromatic polyamide, preferably with steel cords, are embedded in the carcass plies in the area of the tread of the tire. The angular orientation of the high modulus cords of the breaker strips is substantially the same as that of the textile cords of the carcass plies. The width of each breaker strip is less than the width of the tread of the tire. According to a preferred feature a cap ply in the form of a single layer of textile cords of the group of rayon, nylon and polyester, covers the breaker strips and carcass plies in the area of the tread. The lateral edges of the cap ply extend into the sidewalls of the tire.

It was found that the improved tire structure increased the bruise resistance and, quite unexpectedly, the mileage of the tire by more than 50 percent. Thus, it can be appreciated that with the same rated load and speed, fewer carcass plies can be utilized, thereby providing increased flexibility for the sidewalls of the tire. More specifically, it has been found that problems with tread cracking and rapid shoulder wear as experienced with conventional tires without the breaker strips according to the invention, but designed for the same rated load and speed, are avoided by the tire structure of the invention, which results in a regular and even tread wear. Though the above surprising improvements have been also obtained with tires according to the invention wherein the breaker strips have cords of aromatic polyamide, it is presently preferred to use steel cords in the breaker strips. With steel cords in the breaker strips mileage improvements in the range between 60 and 100 percent could be achieved and average mileages up to some 50,000 miles in heavy road transport can be achieved for instance with 18–19.5 Super Single tires of the construction of the invention Super Single is a trademark of The Goodyear Tire & Rubber Company.

DESCRIPTION OF THE DRAWING

The following description of the invention will be better understood by having reference to the annexed drawing, wherein:

FIG. 1 is a section of a tire made in accordance with the invention;

DETAILED DESCRIPTION OF THE INVENTION

Figure 2:
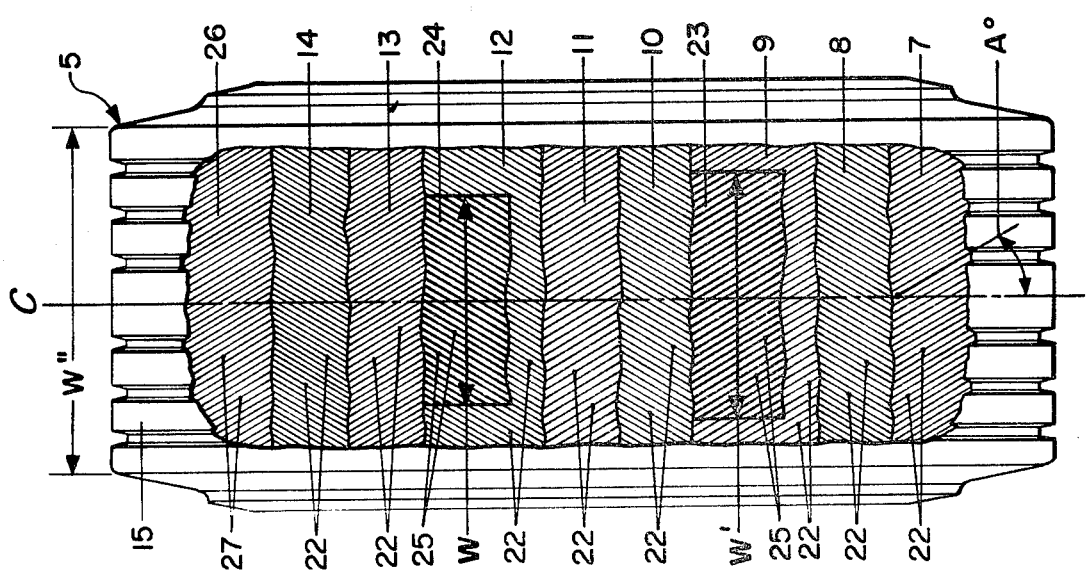
FIG. 2 is a plan view of the tire with portions of the tread removed to show the cord angular relationship of the various plies and breaker strips.

With reference to FIGS. 1 and 2, there is shown a preferred embodiment of a truck tire 5 comprising the essential components of a conventional innerliner 6, a number of carcass plies 7–14 covering the innerliner 6, a tread 15 and pair of sidewalls 16, 17 surrounding the carcass plies 7–14 and terminating at two pairs of inextensible beads 18, 19 and 20, 21.

The carcass plies 7–14 are reinforced with similar textile cords 22 composed of nylon. The textile cords 22 of the carcass plies 7–14 are disposed at angles A in the broad range of from 20 to 55 degrees and in the preferred narrower range of from 20 to 40 degrees measured relative to a plane CP containing the mid-circumferential centerline of the tread 15, the plane herein and in the claims being referred to as the centerplane. The cord angles described here and in the claims are in relation to an uninflated, vulcanized tire. Thus, it can be appreciated that the truck tire 5 is of the bias type.

A pair of breaker strips 23, 24 are embedded in the carcass plies 7–14. The breaker strips 23, 24 are reinforced with similar metal cords 25 which are angularly disposed to the centerplane at angles which are substantially the same as the textile cords 22 of the carcass plies 7–14. The textile cords 22 of successive carcass plies 7–14, as best seen in FIG. 2, are crossed, i.e. they extend in alternate directions from the centerplane of the tire 5. The metal cords 25 of the two breaker strips 23, 24 are mutually crossed. The width W of the radially outermost breaker strip 24 is less than the width W' of the radially innermost breaker strip 23 which, in turn, is at most, not substantially greater than the width W" of the tread 15 and, preferably, less than the width W" of the tread 15 of the tire 5.

A cap strip or ply 26 covers the carcass plies 7–14 and breaker strips 23, 24 in the area of the tread 15 of the tire 5. The cap ply 26 constitutes a single layer of textile cords 27 composed of nylon. The end count of the cap ply 26, i.e. the number of cords per inch, is preferably lower than that of the carcass plies 7–14. The textile cords 27 of the nylon reinforced cap ply or overlay 26 are, likewise, disposed at substantially the same angles relative to the centerplane, as the cords 22, 25 of the carcass plies 7–14 and breaker strips 23, 24. As best seen in FIG. 1, the opposing lateral edges 28, 29 of the nylon overlay or cap ply 26, extend into the sidewalls 16, 17 of the tire 5 to about the mid-point of the sidewalls 16, 17 between the tire beads 18–20 and tread 15. The breaker strips 23, 24 are equally spaced in the tire carcass 30, including the carcass plies 7–14 and nylon overlay or cap ply 26 in this particular embodiment.

Similar narrow strips 31 (FIG. 1) of rubber material are wrapped around each of the lateral edges 32–35 of the breaker strips 23, 24 to help prevent any separation of these edges from adjacent components of rubber material of the tire 5 in which the breaker strips 23, 24 are embedded.

Figure 3:
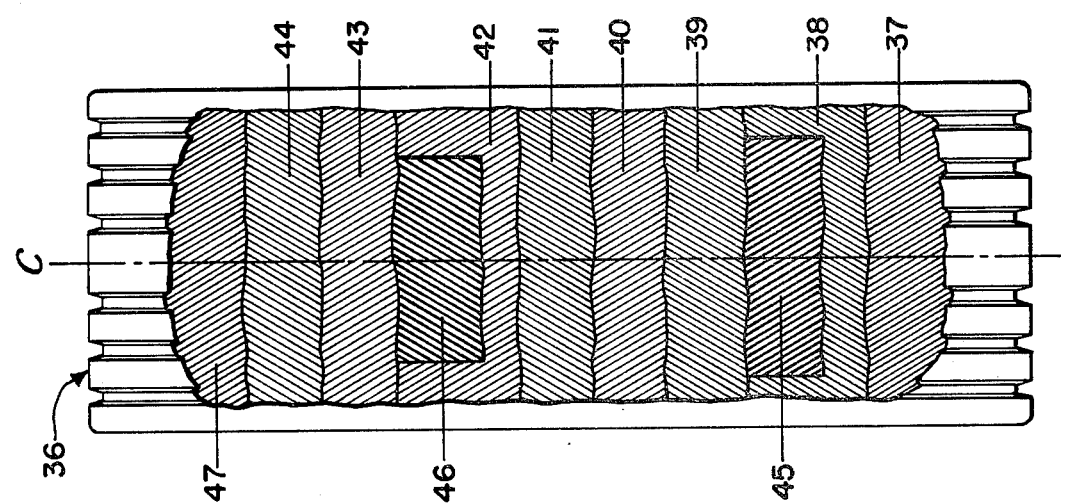
FIG. 3 is a plan view of another tire with portions of the tread removed to show the cord angular relationship of the various plies and breaker strips.

With reference to FIG. 3, there is shown a similar bias-type tire 36 which also has eight carcass plies 37–44, two breaker strips 45, 46 and a nylon cap ply 47, but in a little different arrangement. In this particular embodiment, four carcass plies 39–42 separate the breaker strips 45, 46 which, in turn, are each covered over by a pair of carcass plies 37, 38 and 43, 44, respectively. The thickness of the carcass plies 37, 38 and 43, 44, covering the breaker strips 45 and 46, in this instance, is substantially equal to one-half the radial distance between the breaker strips 45, 46. Although the breaker strips 45, 46 are not equally spaced in the tire carcass, as are the breaker strips 23, 24 of the tire 5 of FIGS. 1 and 2, nevertheless they are uniformly positioned within the carcass plies 37–44 in a definite, preconceived uniform pattern and not randomly spaced or embedded within the carcass plies 37–44.

Figure 4:
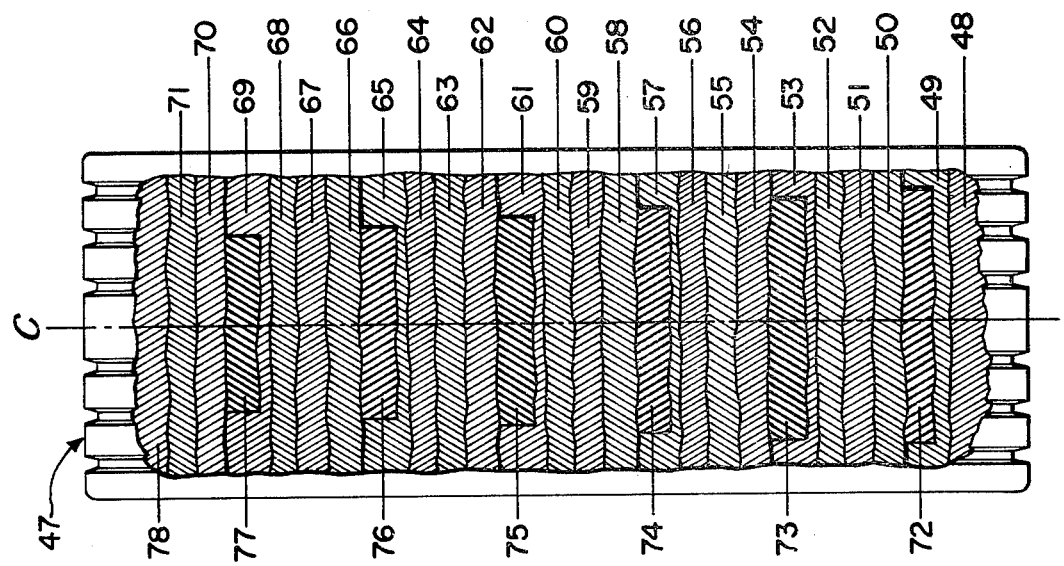
FIG. 4 is a plan view of still another tire with portions of the tread removed to show the cord angular relationship of the various plies and breaker strips.

With reference to FIG. 4, there is shown still another bias-type tire 47 with twenty-four carcass plies 48–71, six breakers 72–77, embedded uniformly in a set pattern within the carcass plies 48–71, and a nylon cap ply 78. The successive breaker strips 45, 46 and 72–77 are narrower in width, the widest breaker strip 45 and 72 having a width similar to the width W' defined for breaker strip 23.

The embodiments shown in the drawing have a number of things in common. For example, each of the breaker strips 23, 24 and 45, 46 and 72–77 are sandwiched between at least two pairs of carcass plies, since this arrangement produces the best uncoupling of the breaker strips from the surrounding carcass plies to facilitate pantographing of the metal cords of the breaker strips and the textile cords of the carcass plies. Further, the cord angles of the metal cords of the breaker strips are substantially equal to the cord angles of the textile cords of the carcass plies. Moreover, the breaker strips, starting from the innermost breaker strip closest the inner crown of the tire, successively decrease in width, the widest of the breaker strips being not substantially greater than the width of the tread of the tire in the footprint of the tire, when the tire is inflated and loaded at a rated standard load specified by the manufacturer of the tire. Also, the metal cords of adjacent breaker strips, as well as the textile cords of adjacent carcass plies without intervening breaker strips, are of the opposite lay, i.e. they cross each other. Further, narrow strips 31 of rubber are folded around the lateral edges of each of the breaker strips to eliminate or substantially reduce separation of the edges of the breaker strips from the surrounding rubber material of the tire in which the breaker strips are embedded.

Whereas in the embodiment of FIG. 2 the cords of a breaker strip are parallel to the cords of one of the adjacent sandwiching carcass plies and cross the cords of the other of the adjacent sandwiching plies and in the embodiments of FIGS. 3 and 4 the cords of a breaker strip cross the cords of both of the adjacent sandwiching plies, the invention is not limited to such structures and within the scope of the invention the cords of a breaker strip may also be substantially parallel to the cords of both of the adjacent sandwiching plies. It is however essential that the breaker strips of high modulus cords are present in one or more pairs and that the cords of the one ply of a breaker strip pair cross the cords of the other ply of said breaker strip pair.

Thus, there has been described an improved truck tire with breaker strips or plies which are reinforced with high modulus cords and embedded in the carcass plies which, in turn, are reinforced with textile cords. A single nylon overlay is used to cap the carcass plies and breaker strips in the area of the tread of the tire.

What is claimed is:

1. A tire comprising:
    (a) a number of carcass plies, each of which is reinforced with textile cords of the group of rayon, nylon and polyester, the textile cords being disposed at substantially the same angles in the range of 20–55 degrees relative to the centerplane of the tire, when the tire is vulcanized and uninflated, the textile cords of adjacent carcass plies separating the breaker strips being in crossed relationship;
    (b) a tread and pair of sidewalls surrounding the carcass plies and terminating at at least one pair of annular, inextensible beads; and
    (c) at least two successive breaker strips embedded in the carcass plies in the area of the tread only, the widest of the breaker strips having a width which is not substantially greater than the width of the tread of the tire in the footprint of the tire when the tire is inflated and loaded at a rated standard load recommended by the manufacturer of the tire, each of said successive breaker strips being sandwiched between at least two pair of carcass plies and reinforced with high modulus cords of the group of materials of steel and aromatic polyamide, said high modulus cords being disposed at angles that are substantially the same as the angles of the textile cords of carcass plies adjacent said breaker strips, the cords of said successive breaker strips being of the opposite hand and in crossed relationship.

2. The tire of claim 1, wherein the cords of each of the breaker strips are substantially parallel to the textile cords of one of the adjacent sandwiching carcass plies and cross the textile cords of the other of the adjacent sandwiching carcass plies.

3. The tire of claim 1, wherein the cords of each of the breaker strips cross the textile cords of the adjacent, sandwiching carcass plies.

4. The tire of claim 1, which includes:
    (d) a cap ply covering the breaker plies and carcass plies in the area of the tread of the tire, the cap ply being a single layer of textile reinforcement cords of the group of rayon, nylon and polyester, the cap ply having lateral edges which extend into the sidewalls of the tire, the textile cords of the cap ply being disposed at substantially the same angles relative to the centerplane as the textile cords of the carcass plies.

5. The tire of claim 4, wherein the textile cords of the cap ply and radially outermost carcass ply, adjacent the cap ply, are in crossed relationship.

6. The tire of claim 4, wherein the number of textile cords per inch in the cap ply, measured transversely of the cap ply, is lower than the correspondingly measured number of textile cords per inch in the carcass plies.

* * * * *